United States Patent
Okubo et al.

(10) Patent No.: US 11,535,152 B2
(45) Date of Patent: Dec. 27, 2022

(54) PARKING SUPPORT DEVICE

(71) Applicant: Hitachi Automotive Systems, Ltd., Hitachinaka (JP)

(72) Inventors: Satoru Okubo, Hitachinaka (JP); Koji Takahashi, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 417 days.

(21) Appl. No.: 16/641,726

(22) PCT Filed: Aug. 1, 2018

(86) PCT No.: PCT/JP2018/028794
§ 371 (c)(1),
(2) Date: Feb. 25, 2020

(87) PCT Pub. No.: WO2019/064907
PCT Pub. Date: Apr. 4, 2019

(65) Prior Publication Data
US 2020/0353866 A1  Nov. 12, 2020

(30) Foreign Application Priority Data
Sep. 29, 2017  (JP) ............................. JP2017-191877

(51) Int. Cl.
| | | |
|---|---|---|
| *B60R 1/00* | (2022.01) | |
| *G01C 21/34* | (2006.01) | |
| *G08G 1/14* | (2006.01) | |

(52) U.S. Cl.
CPC ............ *B60R 1/00* (2013.01); *G01C 21/3407* (2013.01); *G08G 1/143* (2013.01);
(Continued)

(58) Field of Classification Search
None
See application file for complete search history.

(56) References Cited

U.S. PATENT DOCUMENTS

| | | | |
|---|---|---|---|
| 2010/0019934 A1* | 1/2010 | Takano | ................. B60R 1/00 340/932.2 |
| 2015/0317526 A1 | 11/2015 | Muramatsu et al. | |
| 2018/0307919 A1* | 10/2018 | Hayakawa | ............... G06T 7/12 |

FOREIGN PATENT DOCUMENTS

| | | |
|---|---|---|
| EP | 2 147 826 A2 | 1/2010 |
| JP | 2011-39600 A | 2/2011 |

(Continued)

OTHER PUBLICATIONS

Extended European Search Report issued in European Application No. 18861970.4 dated Jun. 11, 2021 (seven (7) pages).

(Continued)

*Primary Examiner* — Adam D Tissot
*Assistant Examiner* — Garrett F Evans
(74) *Attorney, Agent, or Firm* — Crowell & Moring LLP

(57) ABSTRACT

In a tilt parking mode, "a target parking position" can be accurately determined without changing a camera tilt angle and an HMI display range, and can be notified to a driver, so that the usability can be improved. A parking support device includes an external field recognition unit such as a camera and a sonar, which recognizes an external field, an information holding unit which holds information of a parking frame line recognized by the external field recognition unit, a parking region extraction unit which extracts a parking region from information of the parking frame line, a parking position determination unit which determines a target parking position from the parking region, and a path calculation unit which calculates a parking path from a current position of an own vehicle up to the target parking position. In a case where part of the parking frame line is not recognized by the camera, the target parking position is defined on the basis of lines connecting an end point of the parking frame line on a rear side of the own vehicle, a virtually extending line of the parking frame line on a front side of the own vehicle, and a (Continued)

point intersecting with the virtual line on a front side of the vehicle from the end point of the parking frame line on the rear side of the own vehicle.

7 Claims, 8 Drawing Sheets

(52) U.S. Cl.
CPC ..... *B60R 2300/105* (2013.01); *B60R 2300/20* (2013.01); *B60R 2300/806* (2013.01)

(56) References Cited

FOREIGN PATENT DOCUMENTS

| JP | 2013-35327 A | 2/2013 |
|----|---|---|
| JP | 2014-107689 A | 6/2014 |
| WO | WO 2014/084118 A1 | 6/2014 |
| WO | WO 2015/141247 A1 | 9/2015 |

OTHER PUBLICATIONS

International Search Report (PCT/ISA/210) issued in PCT Application No. PCT/JP2018/028794 dated Oct. 23, 2018 with English translation (four (4) pages).

Japanese-language Written Opinion (PCT/ISA/237) issued in PCT Application No. PCT/JP2018/028794 dated Oct. 23, 2018 (three (3) pages).

\* cited by examiner

PARKING SUPPORT DEVICE

TECHNICAL FIELD

The present invention relates to a vehicle control device which parks a vehicle at an arbitrary position according to a result of recognized external field, and particularly to a technology which can set a target parking position even in a case where only a part of a parking frame is recognizable due to a restriction such as a camera tilt angle or an HMI display range, and estimates the target parking position from visible recognition information.

BACKGROUND ART

Conventionally, as a parking support device which supports a driving operation when a vehicle is parked, there is known a technique in which a space of the target parking position is detected to park an own vehicle using a distance measuring sensor for example, a frame image indicating the target parking position is drawn and displayed at a position corresponding to an image captured by a camera, and therefore, a driver can recognize the target parking position.

In addition, regarding the problem that it is hard for the driver to determine whether the target parking position displayed on an HMI is the target parking position automatically detected on the basis of a recognition result, which causes anxiety in operation, there is known a technique in which different frame images are displayed depending on cases where the target parking position can be detected or where not, and therefore, the driver can check the display of the frame image so as to easily grasp whether the target parking position is appropriately detected.

Specifically, in a case where the target parking position is detected, a detection procedure of the target parking position, that is, a frame image indicating a recommended target parking position in a plurality of target parking positions obtained by detection and other detected parking candidates are classified with colors and types of lines, and displayed at each position on an overhead image, so that the driver is informed of that the target parking position is detected.

On the other hand, there is a technique in which, in a case where the target parking position is not able to be detected, a default frame image is displayed at a predetermined default position with respect to a position of the own vehicle, and therefore, instead of a parking frame line displayed on the HMI, a moving target parking position with respect to the own vehicle and a position adjustment icon of the default frame image on the image are displayed, so that the driver is informed of that the position is not able to be automatically detected.

CITATION LIST

Patent Literature

PTL 1: JP 2011-39600 A
PTL 2: JP 2013-35327 A

SUMMARY OF INVENTION

Technical Problem

When a driver selects a desired parking position, the driver operates and selects the parking position on the HMI. Normally, it is necessary to recognize the parking frame with high accuracy by a side camera having a large tilt angle, and a recognition range is approximately a display range of the HMI.

However, the techniques proposed in PTL 1 and PTL 2 are conceptual, and the range of the HMI and a camera recognition range are not clear.

If a proposed range of the parking frame is recognized by the camera, the tilt angle of the camera is assumed to be large, and there is a possibility of causing a problem in the recognition accuracy. Particularly, most of the parking frame lines are not able to be recognized by the camera, or not be displayed on the HMI in an inclined parking mode.

Therefore, in order to accurately recognize the parking frame line, it is necessary to reduce the tilt angle of the camera, but the recognition range is narrowed due to the reduction. Thus, a side camera is used for recognizing the parking frame normally, but the recognition range is approximately equal to the display range of the HMI in view of the recognition accuracy.

Therefore, in the case of the tilt parking mode, it is necessary to approach the parking frame at a short distance due to restrictions on the camera recognition range and the display range of the HMI, and the driver may feel anxiety in a parking lot where the vehicle is parked.

An object of the invention is to improve a usability by accurately determining a "target parking position" without changing a camera tilt angle and an HMI display range in a tilt parking mode, and notifying the driver of the information.

Solution to Problem

In a parking support device of the invention to solve the above problem, an automatic parking system includes an external field recognition unit such as a camera and a sonar, which recognizes an external field, an information holding unit which holds information of a parking frame line recognized by the external field recognition unit, a parking region extraction unit which extracts a parking region from information of the parking frame line, a parking position determination unit which determines a target parking position from the parking region, and a path calculation unit which calculates a parking path from a current position of an own vehicle up to the target parking position. In a case where part of the parking frame line is not recognized by the camera, the target parking position is defined on the basis of lines connecting an end point of the parking frame line on a rear side of the own vehicle, a virtually extending line of the parking frame line on a front side of the own vehicle, and a point intersecting with the virtual line on a front side of the vehicle from the end point of the parking frame line on the rear side of the own vehicle.

Advantageous Effects of Invention

According to the invention, in an inclined parking mode, the target parking position can be determined on the basis of lines connecting the end point of the parking frame line on the rear side of the vehicle, a virtually extending line of the parking frame line on the front side of the vehicle, and the "intersection" intersecting at a right angle from the end point of the parking frame line on the vehicle rear side to a virtual line on the vehicle front side. Therefore, the "target parking position" can be accurately determined without changing a camera tilt angle and an HMI display range, and the usability can be improved by notifying the driver of the information.

In addition, the invention can be mounted without changing a system, so that a versatility is increased and the cost is reduced.

Other features of the invention will be clear from the description and the accompanying drawings. In addition, objects, configurations, and effects besides the above description will be apparent through the explanation on the following embodiments.

DESCRIPTION OF EMBODIMENTS

Hereinafter, embodiments of the invention will be described using the drawings.

The invention is applied to a parking support system in which a target parking position is automatically detected to park an own vehicle, a frame image indicating the target parking position is drawn and overlapped on an overhead image around the own vehicle, so that a driver of the vehicle may recognize and select the automatically-detected target parking position.

Then, particularly in the parking support system to which the invention is applied, a target parking position can be estimated from currently recognized information regardless of a situation that most parking frame line is not recognizable in a tilt parking mode. For example, in a case where it is possible to recognize an end point the parking frame line on a vehicle rear side and an "intersection" where the end point of the parking frame line on the vehicle rear side and the parking frame line on a vehicle front side intersect at a right angle, the target parking position can be calculated, and the notification to the driver can be performed without any problem. However, in a case where the "intersection" is not recognizable, the target parking position can be determined on the basis of lines connecting the end point of the parking frame line on the vehicle rear side, a line virtually extending from the parking frame line on the vehicle front side, and an "intersection" intersecting at a right angle from the end point of the parking frame line on the vehicle rear side to a virtual line on the vehicle front side.

In the following, the description will be given using an overhead view in a case where the vehicle is away from a parking frame end by a certain distance in a parking lot of which the parking frame line is inclined.

Figure 1:
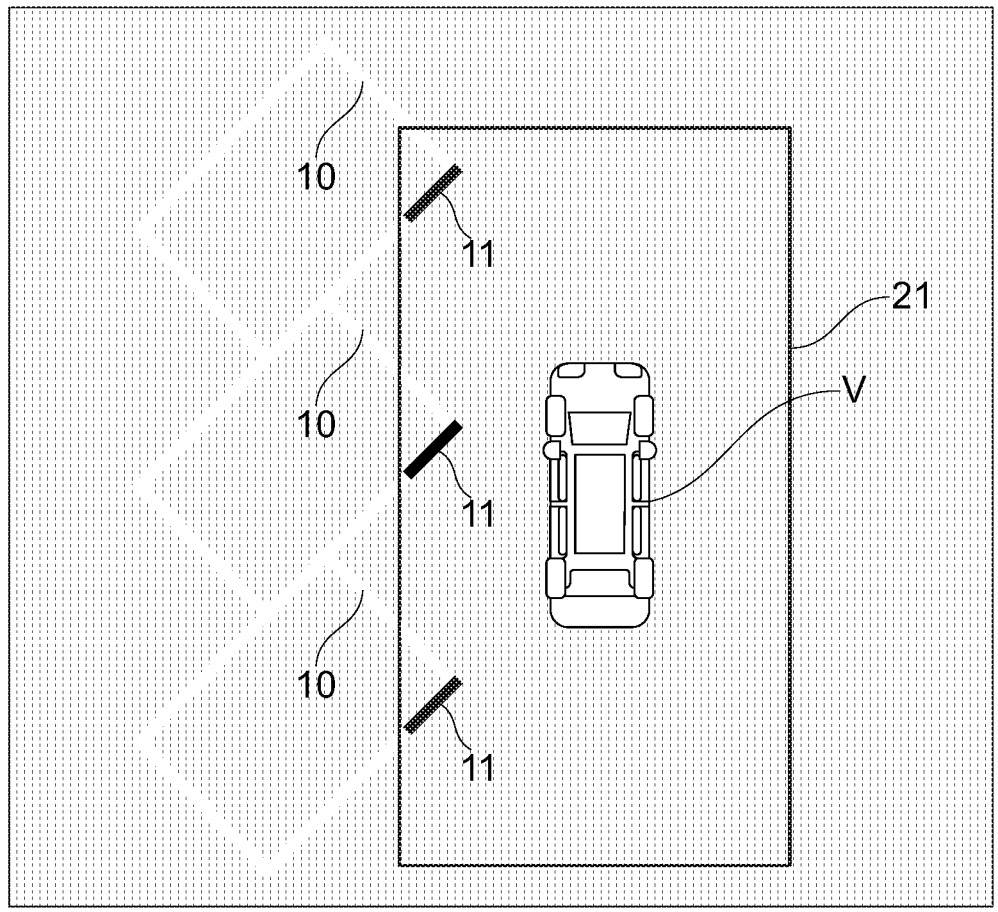
FIG. 1 is an overhead view in a case where a vehicle is 1.5 m away from a parking frame end in a parking lot in which a parking frame line is inclined by 45 deg.

An overhead view in the parking support system is illustrated in FIG. 1.

In the overhead view, a vehicle V is 1.5 m away from the parking frame end in a parking lot of which the parking frame line is inclined by 45 deg. The parking frame line is recognized by a side camera from the viewpoint of recognition accuracy. The recognition range is almost the same as a display range 11 of an HMI unit. A distance of 1.5 m from the parking frame end is a boundary distance at which the driver feels anxiety. However, in a parking lot of the inclined parking, it can be seen that most parking frame line is not recognizable. However, in order to calculate the target parking position, there is a need to recognize the end point of the parking frame line on the vehicle rear side, and an "intersection" at which the end point of the parking frame line on the vehicle rear side and the parking frame line on the vehicle front side intersect at a right angle. Therefore, most automatic parking systems are not able to cope with the inclined parking.

Figure 2:
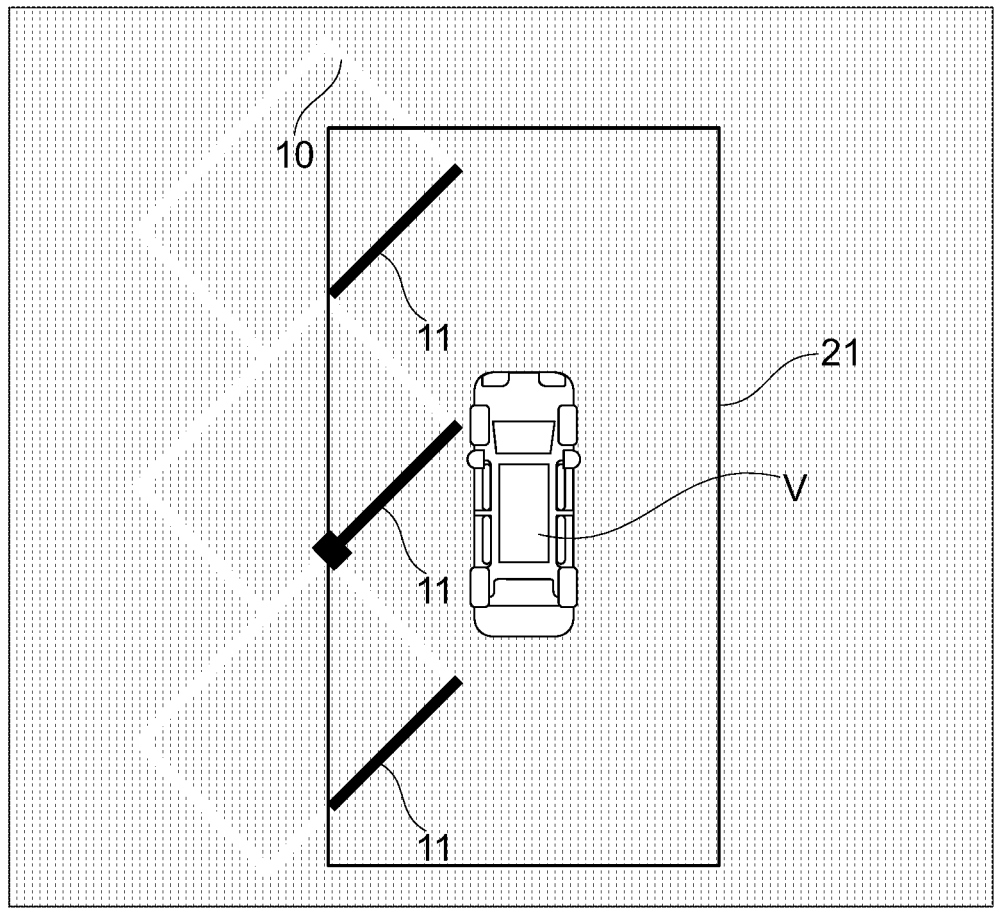
FIG. 2 is an overhead view in a case where the vehicle is 0.5 m away from the parking frame end in the parking lot where the parking frame line is inclined by 45 deg.

Similarly, FIG. 2 illustrates an overhead view in a case where the vehicle V is 0.5 m away from the parking frame end. It can be seen that it is not clear whether the end point of the parking frame line on the vehicle rear side, and the "intersection" where the end point of the parking frame line on the vehicle rear side and the parking frame line on the vehicle front side intersect at a right angle are recognizable in order to calculate the target parking position regardless of a situation that the vehicle approaches in such a short distance.

Figure 3:
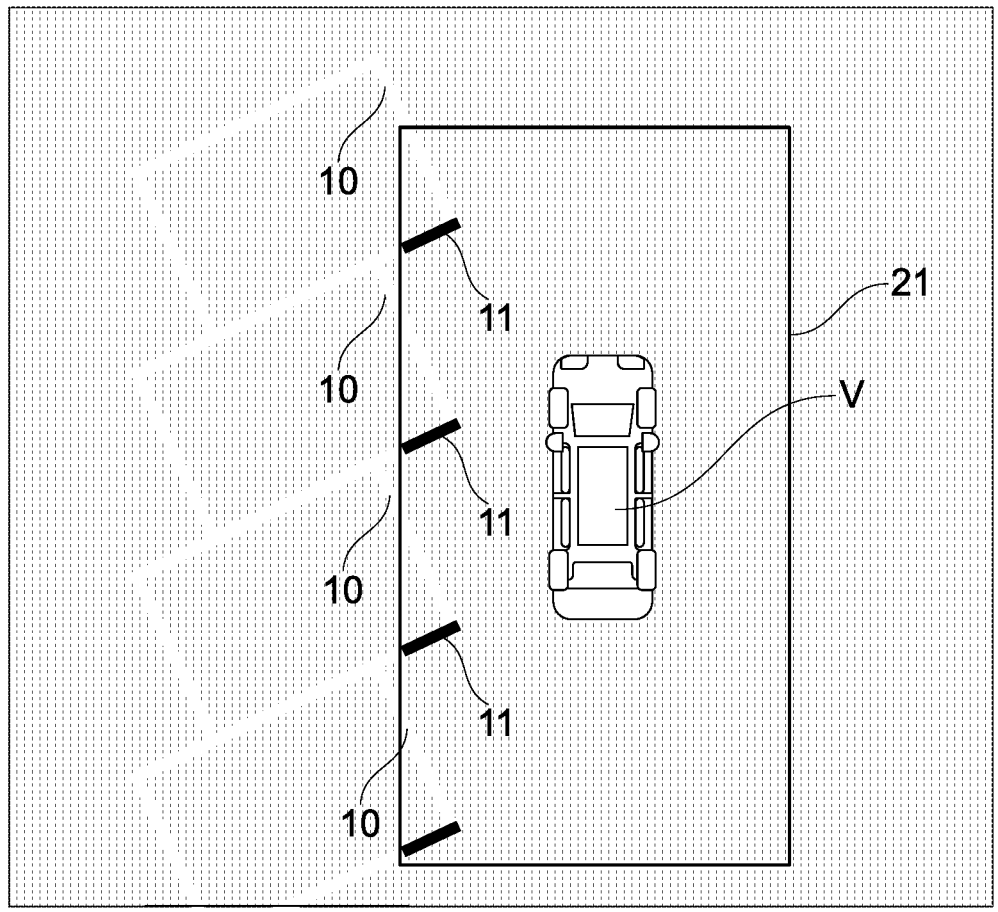
FIG. 3 is an overhead view in a case where the vehicle is 1.5 m away from the parking frame end in the parking lot where the parking frame line is inclined by 60 deg.

Next, FIG. 3 illustrates an overhead view in a case where the own vehicle V is 1.5 m away from the parking frame end in the parking lot of which the parking frame line is inclined by 60 deg. The parking frame line is recognized by a side camera from the viewpoint of recognition accuracy. The recognition range is almost the same as the display range of an HMI unit. Herein, it can also be seen that it is not clear whether the end point of the parking frame line on the vehicle rear side, and the "intersection" where the end point of the parking frame line on the vehicle rear side and the parking frame line on the vehicle front side intersect at a right angle are recognizable in order to calculate the target parking position.

Figure 4:
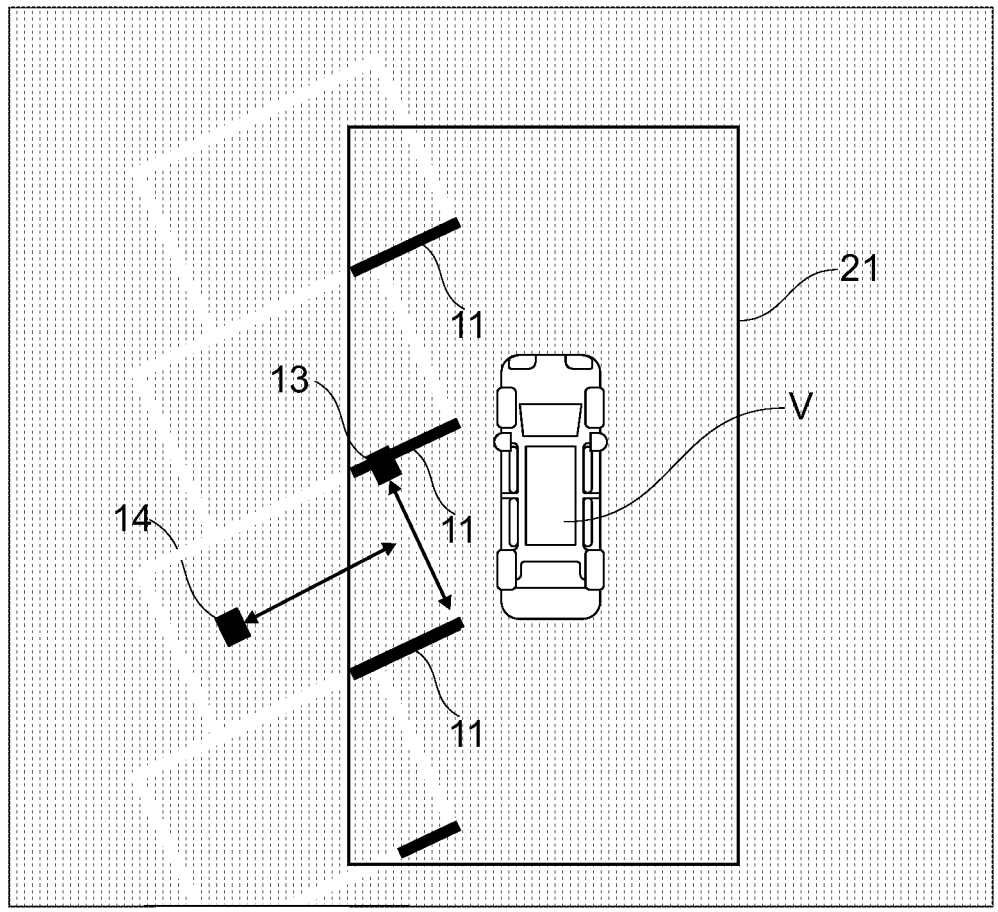
FIG. 4 is an overhead view in a case where the vehicle is 0.5 m away from the parking frame end in the parking lot where the parking frame line is inclined by 60 deg.
Figure 5:
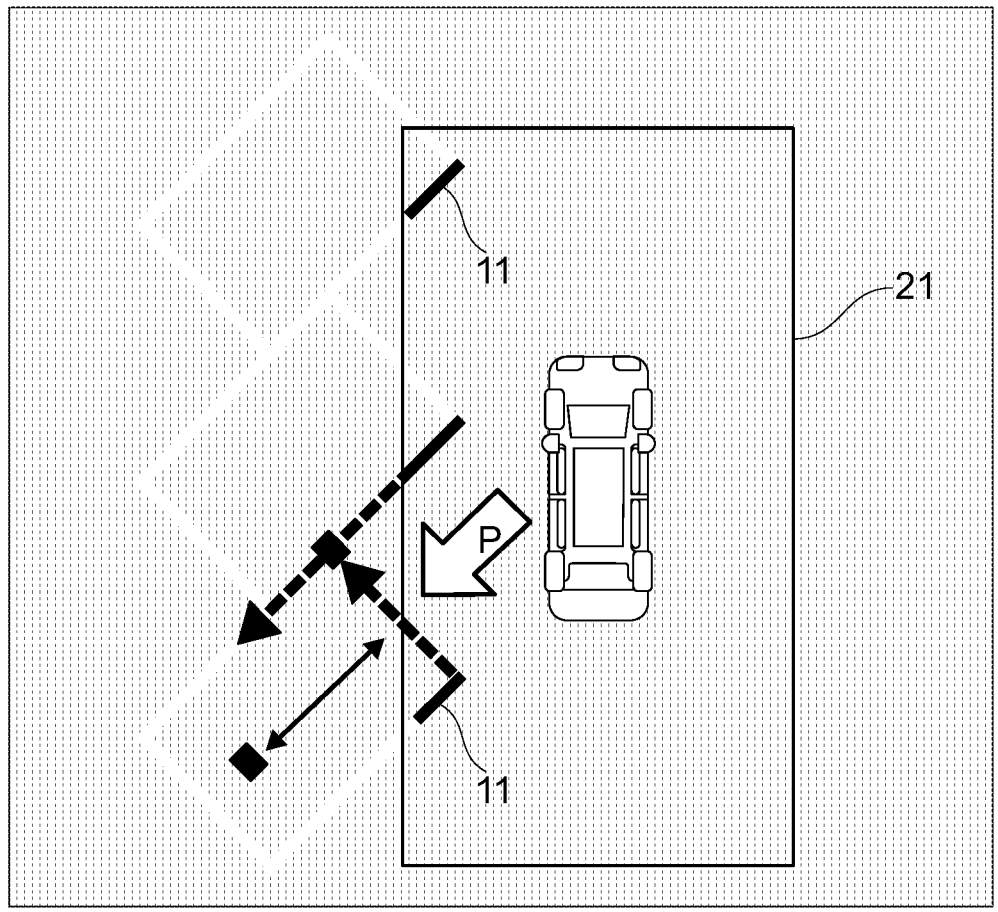
FIG. 5 is a diagram illustrating an application example of the invention, and a method for determining a target parking position in a case where the vehicle is 1.5 m away from the parking frame end in the parking lot where the parking frame line is inclined by 45 deg.
Figure 6:
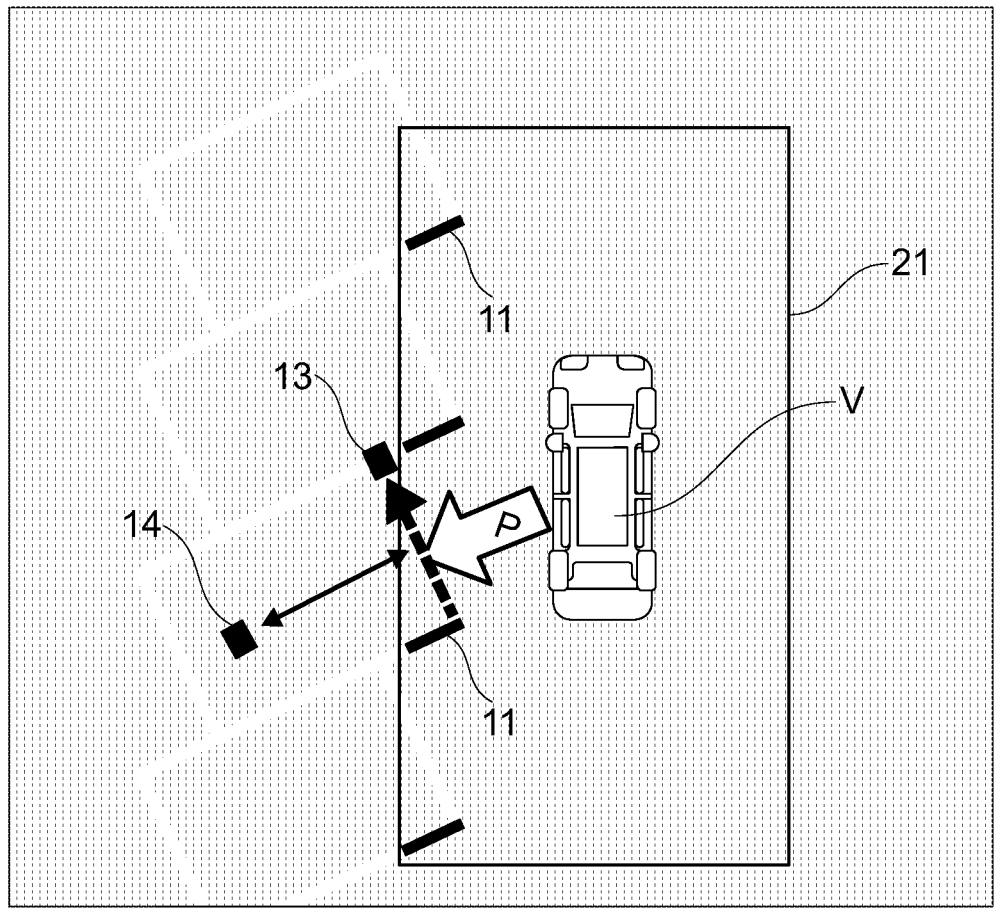
FIG. 6 is a diagram illustrating an application example of the invention, and a method for determining a target parking position in a case where the vehicle is 1.5 m away from the parking frame end in the parking lot where the parking frame line is inclined by 60 deg.
Figure 7:
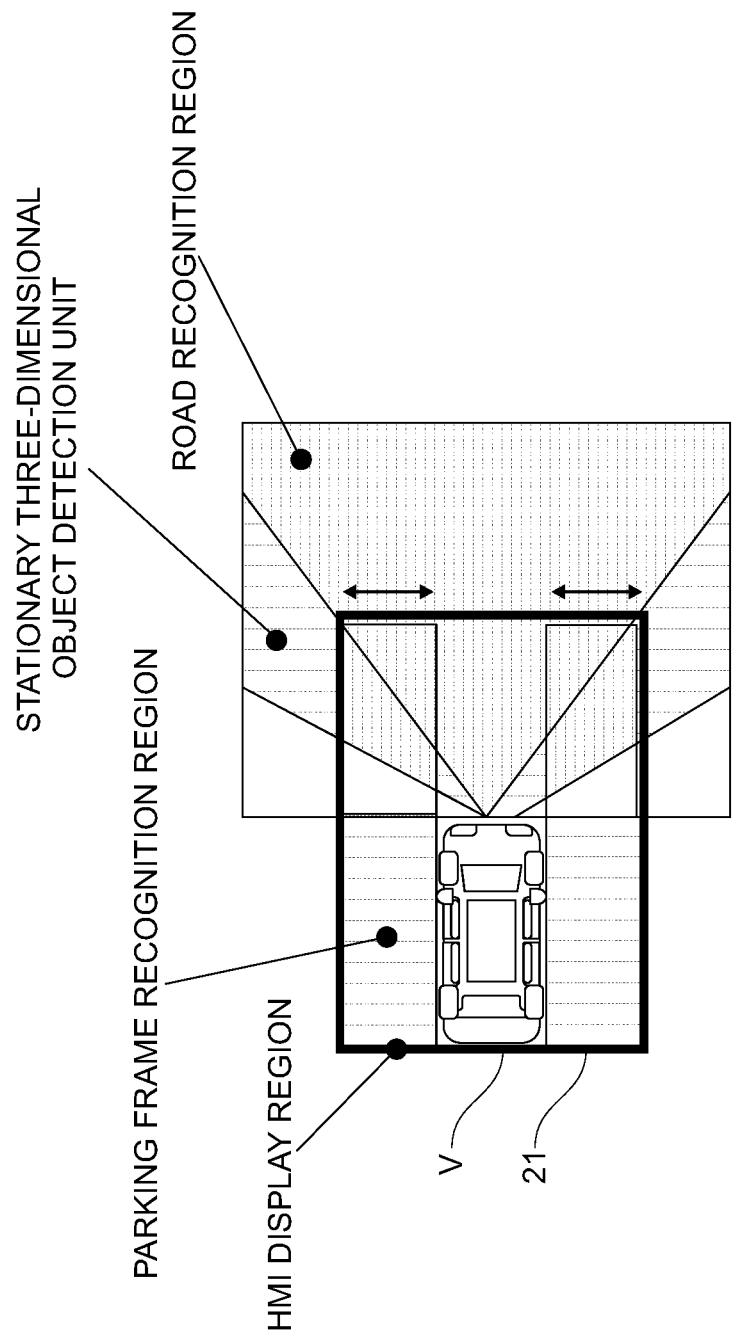
FIG. 7 is a diagram illustrating a recognition range in a camera.
Figure 8:
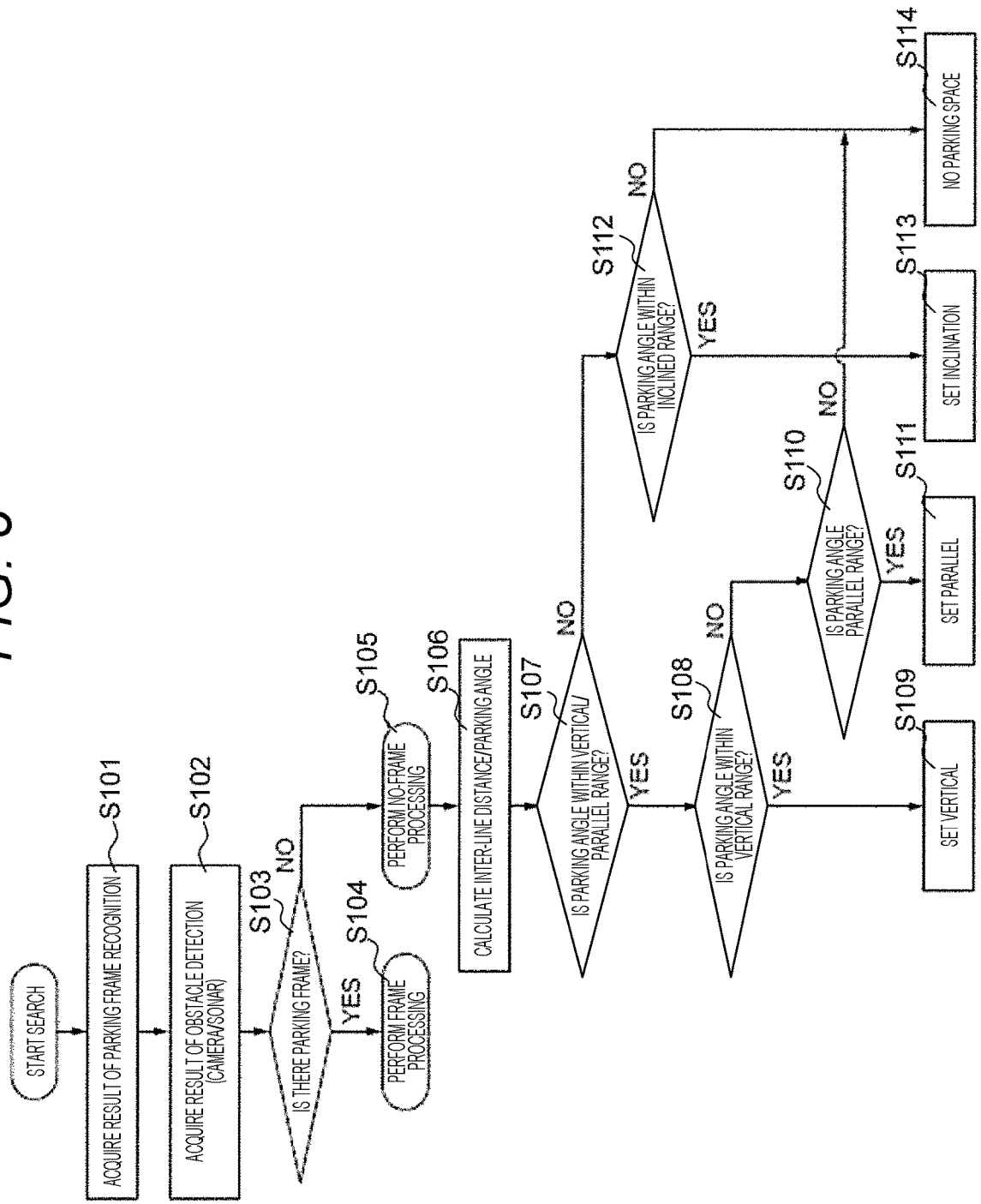
FIG. 8 is a flowchart of control up to a tilt parking mode.

On the other hand, in a case where the vehicle V is 0.5 m away from the parking frame end in the parking lot of which the parking frame line is inclined by 60 deg, it is possible to securely recognize the "intersection" where the end point of the parking frame line on the vehicle rear side and the "intersection" where the end point of the parking frame line on the vehicle rear side and the parking frame line on the vehicle front side intersect at a right angle as illustrated in FIG. 4. Therefore it is possible to set the target parking position. However, in an actual environment, there are other vehicles in the parking frames, and approaching up to 0.5 m may cause anxiety.

In other words, in the tile parking mode, there is a need to increase a coverage in an actual environment. One of corresponding techniques is to expand a recognition region of the camera. However, a camera performance UP, a camera tilt angle resetting, and a recognition logic redesigning come into request, and make the cost increase. In addition, as another method, the expansion of the HMI display range is exemplified. This method seems to be optimized at a glance, but the recognition information is complicated, causing the relation with a position of the own vehicle to be hardly understood. In addition, a display object becomes small, and is hardly recognized by the driver. Therefore, there is a need of a device to accurately determine the "target parking position" without changing the camera tilt angle and the HMI display range.

Thus, in an environment that the parking frame line is almost not able to be recognized in an inclined parking mode, the target parking position is determined on the basis of lines connecting the end point of the parking frame line on the rear side of the vehicle, a virtually extending line of the parking frame line on the front side of the vehicle, and the "intersection" intersecting at a right angle from the end point of the parking frame line on the vehicle rear side to a virtual line on the vehicle front side, and information is displayed on the HMI to indicate that parking is possible, so that the driver can recognize that the vehicle is able to be parked even in a region which is not displayed on the HMI. Therefore, the "target parking position" can be accurately determined without changing the camera tilt angle and the HMI display range, and can be notified to the driver, so that the usability can be improved.

A parking support device of the invention includes an external field recognition unit which recognizes an external field, an information holding unit which holds information of a parking frame line recognized by the external field recognition unit, a parking region extraction unit which extracts a parking region from information of the parking frame line, a parking position determination unit which determines a target parking position from the parking region, and a path calculation unit which calculates a parking path from a current position of an own vehicle up to the target parking position. In a case where part of the parking frame line is not recognized by the external field recognition unit, the target parking position is defined on the basis of lines connecting an end point of the parking frame line on a rear side of the own vehicle, a virtually extending line of the parking frame line on a front side of the own vehicle, and a point intersecting with the virtual line on a front side of the vehicle from the end point of the parking frame line on the rear side of the own vehicle.

Then, the external field recognition unit preferably recognizes the parking frame line using cameras which are attached at a leading end of the vehicle, a trailing end of the vehicle, or both side ends of the vehicle.

In addition, the parking frame line preferably includes at least any one of a parallel line, a parking frame surrounded by lines, double parallel lines, a U-like frame line, an independent frame, and a T-like frame line. A center, an inner side, or an outer side of the frame line is preferably detected using the external field recognition unit.

The parking region extraction unit preferably includes an inclined parking determination unit which determines whether the parking frame line is inclined with respect to a position of the own vehicle on the basis of the information of the parking frame line recognized by the external field recognition unit.

There is provided an HMI unit which displays information on parking to a driver and receives information from the driver. In a case where part of the parking frame line is out of a display range of the HMI unit, the target parking position is preferably defined on the basis of lines connecting an end point of the parking frame line on a rear side of the own vehicle displayed in the HMI unit, a virtually extending line of the parking frame line on a front side of the own vehicle, and a point intersecting with the virtual line on the front side of the vehicle from the end point of the parking frame line on the rear side of the own vehicle.

In a case where part of the parking frame line is out of the display range of the HMI unit and it is determined that the target parking position is able to be defined on the basis of lines connecting the end point of the parking frame line on the rear side of the own vehicle displayed in the HMI, the virtually expending line of the parking frame line on the front side of the own vehicle, and the point intersecting with the virtual line on the front side of the vehicle from the end point of the parking frame line on the rear side of the own vehicle, the HMI unit preferably displays information on the HMI unit to indicate that parking is possible.

In a case where part of the parking frame line is out of the display range of the HMI unit, and the parking frame line on the rear side of the own vehicle displayed in the HMI unit and the parking frame line on the front side of the own vehicle are recognized, the HMI unit preferably determines whether the parking frame line is inclined with respect to a position of the own vehicle by the inclined parking determination unit.

In a case where it is determined that the parking frame line is inclined with respect to the position of the own vehicle, the HMI unit preferably displays information on the HMI unit to indicate that the parking is possible.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

The invention claimed is:

1. A parking support device, comprising:
an external field recognition unit which recognizes an external field; and
an HMI unit, wherein the parking support device is configured to: i) hold
information of a parking frame line recognized by the external field recognition unit, ii) extract
a parking region from information of the parking frame line, iii) determine
a target parking position from the parking region, and iv) calculate
a parking path from a current position of an own vehicle up to the target parking position, wherein
in a case where part of the parking frame line is not recognized by the external field recognition unit, the target parking position is defined on the basis of lines connecting an end point of the parking frame line on a rear side of the own vehicle, a virtually extending line of the parking frame line on a front side of the own vehicle, and a point intersecting with the virtual line on a front side of the vehicle from the end point of the parking frame line on the rear side of the own vehicle;
the HMI unit displays information on parking to a driver and receives information from the driver, in a case where part of the parking frame line is out of a display range of the HMI unit, the target parking position is defined on the basis of lines connecting an end point of the parking frame line on a rear side of the own vehicle displayed in the HMI unit, a virtually extending line of the parking frame line on a front side of the own vehicle, and a point intersecting with the virtual line on the front side of the vehicle from the end point of the parking frame line on the rear side of the own vehicle, wherein the target parking position is accurately displayed without changing a camera tilt angles and without changing the HMI display range.

2. The parking support device according to claim 1, wherein the external field recognition unit recognizes the parking frame line using cameras which are attached at a leading end of the vehicle, a trailing end of the vehicle, or both side ends of the vehicle.

3. The parking support device according to claim 1, wherein the parking frame line includes at least any one of a parallel line, a parking frame surrounded by lines, double parallel lines, a U-like frame line, an independent frame, and a T-like frame line, and wherein a center, an inner side, or an outer side of the frame line is detected using the external field recognition unit.

4. The parking support device according to claim 1, wherein the parking support device is also configured to determine whether the parking frame line is inclined with respect to a position of the own vehicle on the basis of the information of the parking frame line recognized by the external field recognition unit.

5. The parking support device according to claim 1, wherein, in a case where part of the parking frame line is out of the display range of the HMI unit and it is determined that the target parking position is able to be defined on the basis of lines connecting the end point of the parking frame line on the rear side of the own vehicle displayed in the HMI, the virtually extending line of the parking frame line on the front side of the own vehicle, and the point intersecting with the virtual line on the front side of the vehicle from the end point of the parking frame line on the rear side of the own vehicle, the HMI unit displays information on the HMI unit to indicate that parking is possible.

6. The parking support device according to claim 1, wherein, in a case where part of the parking frame line is out of the display range of the HMI unit, and the parking frame line on the rear side of the own vehicle displayed in the HMI unit and the parking frame line on the front side of the own vehicle are recognized, the HMI unit determines whether the parking frame line is inclined with respect to a position of the own vehicle by the inclined parking determination unit.

7. The parking support device according to claim 6, wherein, in a case where it is determined that the parking frame line is inclined with respect to the position of the own vehicle, the HMI unit displays information on the HMI unit to indicate that the parking is possible.

* * * * *